United States Patent [19]

Uehara

[11] 4,324,162

[45] Apr. 13, 1982

[54] MACHINE TOOL HAVING HOLLOW MAIN SPINDLE AND BAR STOCK FEEDING MECHANISM

[75] Inventor: Sukehiro Uehara, Ueda, Japan

[73] Assignee: Kabushiki Kaisha Miyano Tekkosho, Ueda, Japan

[21] Appl. No.: 157,753

[22] Filed: Jun. 9, 1980

[30] Foreign Application Priority Data

Jun. 22, 1979 [JP] Japan .................................. 54-78826
Nov. 24, 1979 [JP] Japan ................................ 54-152283

[51] Int. Cl.³ ........................ B23B 13/02; B23B 13/08
[52] U.S. Cl. ........................................ 82/2.5; 82/2.7; 82/38 A
[58] Field of Search ...................... 82/38 A, 38 R, 2.5, 82/2.7

[56] References Cited

U.S. PATENT DOCUMENTS

| | | | |
|---|---|---|---|
| 3,101,019 | 8/1963 | Lelan | 82/2.5 |
| 3,266,348 | 8/1966 | Mancia | 82/2.5 |
| 3,691,879 | 8/1972 | Blake | 82/2.5 |

FOREIGN PATENT DOCUMENTS

| | | | |
|---|---|---|---|
| 46-25015 | 8/1971 | Japan | 82/2.5 |
| 663489 | 5/1979 | U.S.S.R. | 82/2.5 |

*Primary Examiner*—Leonidas Vlachos
*Attorney, Agent, or Firm*—Ladas & Parry

[57] ABSTRACT

In a machine tool having a horizontal, hollow main spindle having therein a main chuck for gripping a bar stock and confronting at a front thereof a machining zone, into which the forward end of the bar stock is intermittently fed through the main chuck from the rear for every cycle of machining by a selected tool mounted on a tool support structure on feed slides and brought into the machining zone to carry out machining of the bar stock, a bar end support engages and supports the forward end of the bar stock at the start of each intermittent feeding thereof and stably guides the same fully into position for machining, unrelatedly to the rotation of the main spindle, whereby the cyclic bar feeding and machining operation can be continuously carried out without stopping the main spindle. Means are provided whereby bar stocks of circular cross-sectional shape and any shape other than a circle can be thus machined.

6 Claims, 15 Drawing Figures

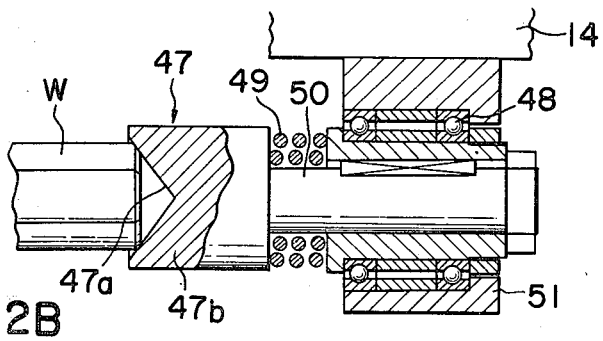
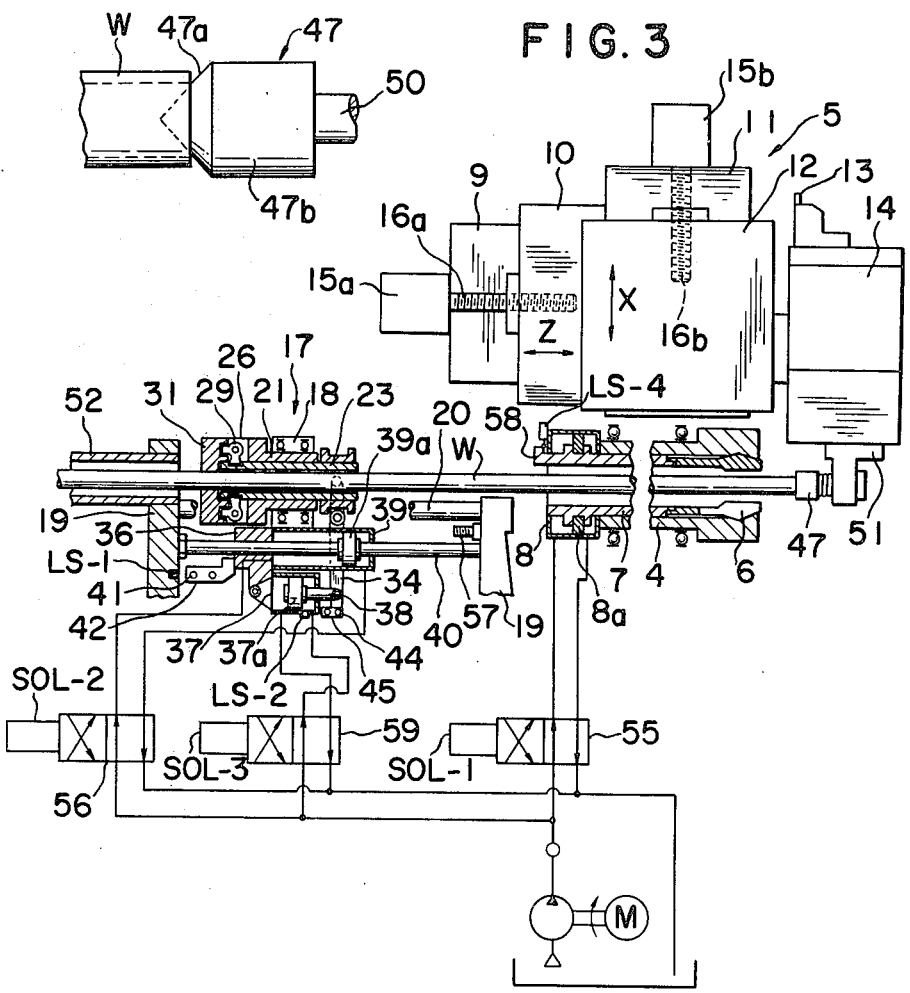

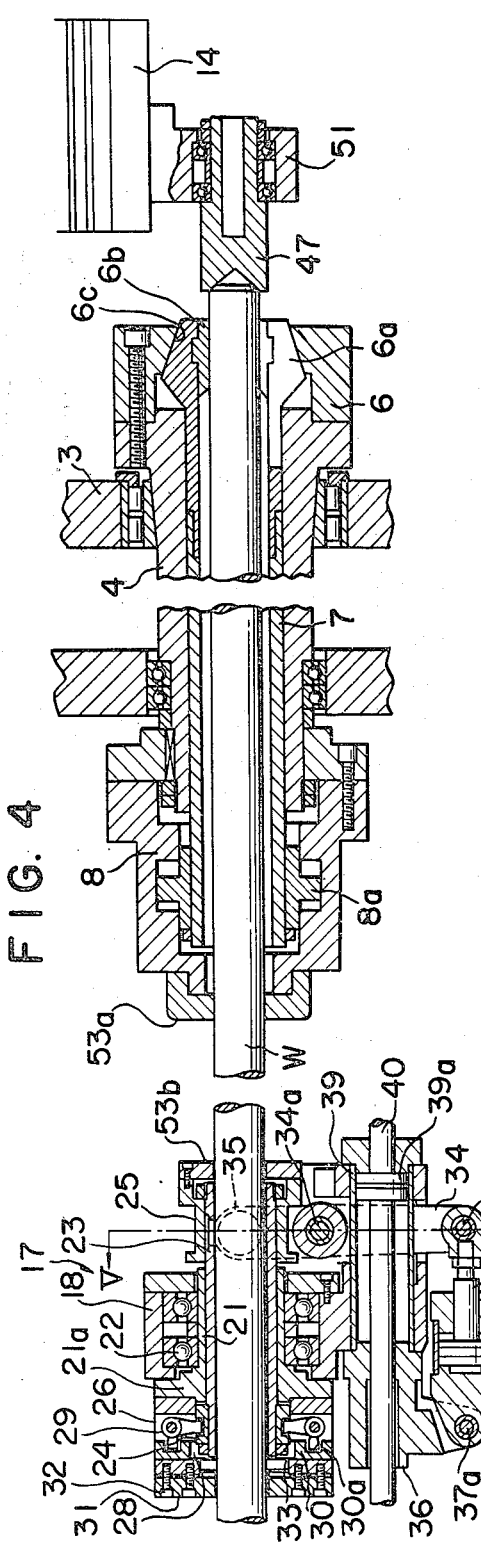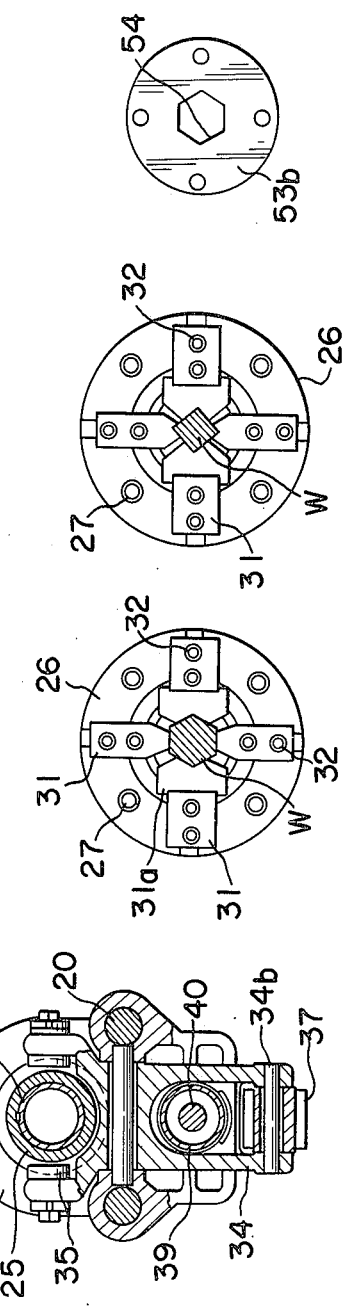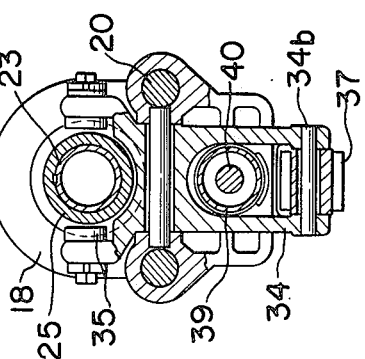

MACHINE TOOL HAVING HOLLOW MAIN SPINDLE AND BAR STOCK FEEDING MECHANISM

BACKGROUND OF THE INVENTION

This invention relates generally to machine tools of the class having a horizontal, hollow main spindle through which a bar stock is fed by a bar stock feeding mechanism disposed coaxially to the rear of the main spindle and is gripped by a main spindle chuck disposed at the forward end of the main spindle to be machined by any of a plurality of tools held by a cutting tool holder.

More particularly, the invention relates to a device for intermittently feeding the bar stock for every cycle of machining in a machine tool of the above stated character, the main spindle being kept rotating continuously without stopping, and the bar stock also being rotated unitarily with the main spindle irrespective of the cross-section shape of the bar stock.

Heretofore, in a machine tool of the above stated character wherein a bar stock is successively fed in an intermittent manner, for every cycle of machining, from the rear of the main spindle into a machining zone, or area, the gripping parts of the feed chuck of the bar stock feeding device and of the main spindle are adapted and shaped to be suitable for gripping the outer surface of the bar stock, and the bar stock is caused to rotate unitarily with the main spindle. Two methods have been devised for newly feeding the bar stock by a specific length after every machining cycle. In the first method, the rotation of the main spindle is temporarily stopped. In the second method, the rotation of the main spindle is not stopped.

In the first method, the main spindle is braked after each machining cycle and stopped. Because this stopping is repeated with a high frequency, various difficulties arise. For example, the motor for driving the main spindle overheats, or play develops between parts to be tightened, of the main spindle assembly, whereby the precision of the main spindle is seriously affected, and this may become a cause of a breakdown or defective operation.

In the second method, there are problems particularly in the case of machining of bar stock of somewhat long length requiring center work or in the case of machining bar stock of long length by dividing the feeding thereof into the machining zone into two cycles thereby to attain some precision. More specifically, at the time of feeding the bar stock, the bar stock is released from the main spindle chuck by the loosening action thereof, but, in the interval during which it is supplied into the machining area, it is caused by centrifugal force to undergo head-shaking oscillation of the first overtone mode or of a higher order overtone mode. This oscillation will cause wear or damage of the gripping parts of the main spindle chuck and impart a considerable adverse effect on also the main spindle. In the case where the rotation speed of the main spindle is high, there will be a considerably high degree of danger. Furthermore, this oscillation in some cases imposes a limit to the feeding operation of the tools adjacent to the machining area or of the tool holder or head.

Still other problems have arisen in the prior art because of the manner of rotating the bar stock in the case where it is fed into the machining zone without stopping the main spindle. In this case, the rotations of the main spindle and of the bar stock at the time of its feeding have heretofore been unrelated to each other, and the bar stock is rotated merely by frictional contact thereof with the inner wall surface of the main spindle. This gives rise to a violent abrasion particularly between the bar stock and the chucks for gripping the bar stock, whereby there is severe wear and even breakage of the chucks. There is also a high possibility of damage to the inner wall surface of the main spindle.

SUMMARY OF THE INVENTION

It is an object of this invention to overcome the above described problems encountered in the prior art with respect to bar stock feeding devices of the instant character.

Another object of the invention is to eliminate idle time thereby to reduce the overall feed time in the process of feeding the bar stock in a device of the present class.

According to this invention in one aspect thereof, briefly summarized, there is provided, in a machine tool of the type having a hollow main spindle having therein a main chuck for gripping a bar stock and confronting at a front end thereof a machining zone, into which the forward leading end of the bar stock is intermittently fed through the main spindle and the main chuck from the rear thereof for every cycle of machining by a bar stock feeding mechanism having a feed chuck for gripping the bar stock and disposed to the rear of the main spindle, and into which zone a selected tool mounted on a tool support structure supported on feed slides is brought into position to carry out machining of the bar stock, the improvement which comprises a bar end support which engages and supports the leading end of the bar stock at the start of each intermittent feeding thereof and, as a result of the movement of a feed slide corresponding to the feeding movement of the bar stock, and while continuing to support the end of the bar stock, brings the bar stock end fully into position for machining in the machining zone, unrelatedly to the rotation of the main spindle, whereby the cyclic bar feeding and machining operation can be continuously carried out without stopping the main spindle.

According to this invention in another aspect thereof, the machine tool described above is provided, in the case where the bar stock is of a cross-sectional figure other than a circle, with gripping parts of the feed chuck and of the main spindle chuck which are of shapes suitable for the cross-sectional figure and are mutually matched in angular alignment, or phase, prior to operation, and the bar stock is rotated unitarily with the main spindle during operation.

The nature, utility, and further features of this invention will be more clearly apparent from the following detailed description with respect to preferred embodiments of the invention when read in conjunction with the accompanying drawings briefly described below.

BRIEF DESCRIPTION OF THE DRAWINGS

In the drawings:

FIG. 2A is a relatively enlarged plan view, with parts shown in longitudinal section, of one example of a bar end support according to the invention;

FIG. 2B is a view similar to FIG. 2A but showing a modified example of the bar end support;

FIG. 3 is a simplified schematic diagram for a description of the bar stock feeding operation in one embodiment of this invention;

FIG. 4 is a longitudinal section of the main spindle and the bar stock feeding mechanism, with parts cut away and foreshortened, showing an example in more specific detail of mechanisms related to the bar stock feeding mechanism according to the invention;

FIG. 5 is a cross section taken along the plane indicated by line V—V in FIG. 4 as viewed in the arrow direction;

FIGS. 6A and 6B are rear views of the feed chuck in the bar stock feeding mechanism, respectively showing interchangeable gripping parts for gripping a hexagonal bar stock and a square bar stock;

FIG. 7 is a view showing an example of a support member which is for supporting the bar stock and is in matched angular alignment, or phase, with the main spindle chuck and the feed chuck;

FIG. 10 is a schematic view perpendicular to the axis of the main spindle showing another embodiment of the invention;

FIG. 11 is a view similar to FIG. 10 showing still another embodiment of the invention and a fluid-pressure system for controllably actuating various mechanisms in the bar stock feeding mechanism; and FIG. 12 is a plan view in longitudinal section showing another example of a bar end support.

DETAILED DESCRIPTION OF THE INVENTION

Figure 1:
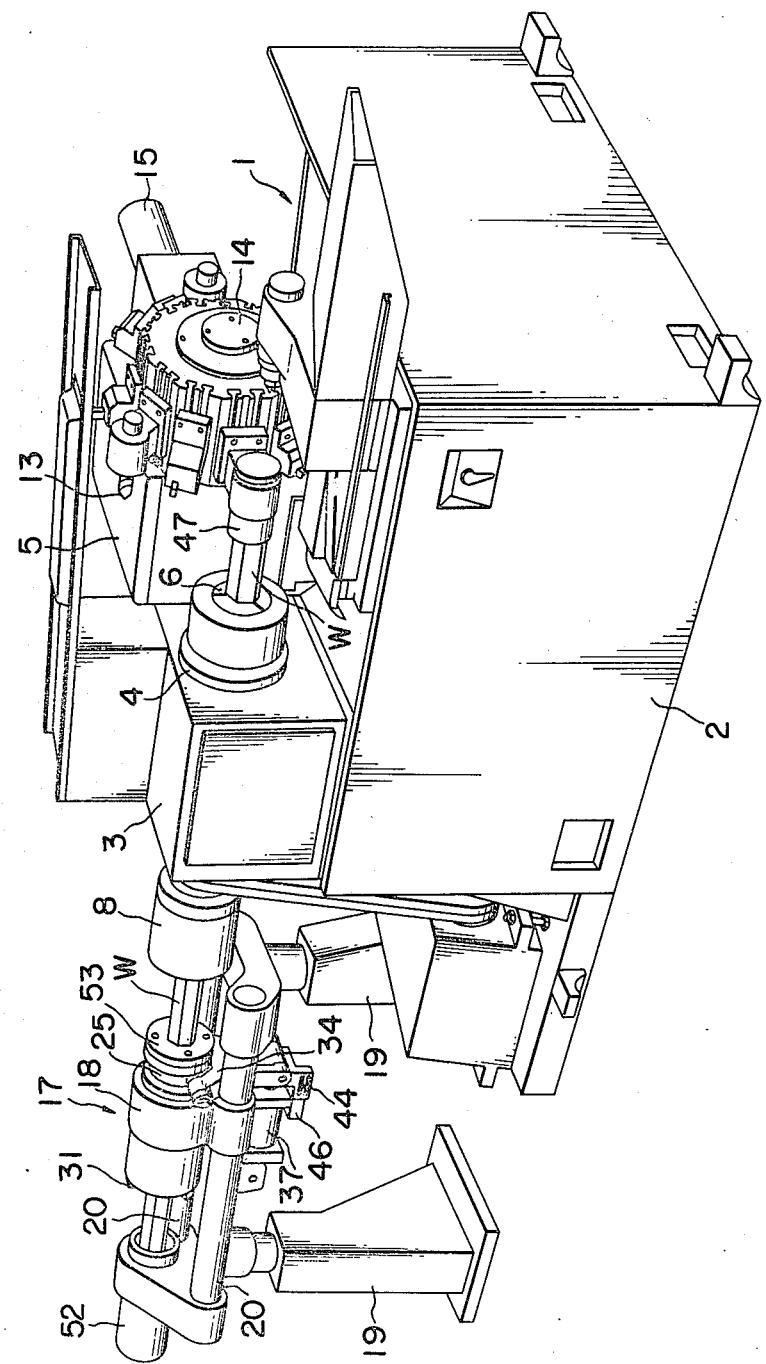
FIG. 1 is a perspective view of a coupled combination of a machine tool and a bar stock feeding mechanism in which improvements, including a bar end support, according to this invention are applied.

The bar stock feeding system of this invention is applicable in a machine tool such as that illustrated in FIG. 1. This machine tool 1 has a bed 2, a head stock or spindle stock 3 fixedly mounted on the bed 2, a horizontal main spindle 4 rotatably supported by the spindle stock 3, and a tool head 5 disposed on one side of the machining area. The main spindle 4 is hollow and, at its ending facing the machining area, is provided coaxially with a main spindle chuck 6 having, as shown in FIG. 4, jaws 6a with gripping parts 6b for gripping the outer surface of a bar stock material W inserted through the main spindle 4 from the rear part thereof.

As indicated in FIG. 4, a tubular actuating member 7 is coupled at its front end to the rear end of the jaws 6a of the main spindle chuck 6 and slidably and coaxially supported within the main spindle 4. The actuating member 7 is driven by a first hydraulic cylinder 8, which is mounted coaxially on the rear end of the main spindle 4 and has a piston 8a secured to the actuating member 7. When the actuating member 7 is thrust forward by the hydraulic cylinder 8, it forces the chuck jaws 6a against an inclined surface 6c, whereby the jaws are caused by wedge action to clamp the bar stock W in the manner well known in the art. The above described mechanisms may be controlled through mechanical means.

A tool head 5 is mounted on the bed 2 at a position on one side of the chuck 6 and the machining area as indicated in FIGS. 1 and 3. The principal parts of this tool head 5 are: a Z-axis slide rail 9 supported on the bed 2 to extend horizontally and parallely to the Z axis parallel to the axis of the main spindle 4; a Z-axis slide 10 slidably mounted on the Z-axis slide rail 9 thereby to undergo feeding movement in the Z-axis direction; an X-axis slide rail 11 mounted on the Z-axis slide 10 to extend horizontally in the X axis, which is perpendicular to the Z axis; an X-axis slide 12 slidably mounted on the X-axis slide rail 11 thereby to undergo feeding movement in the X-axis direction; and a tool support cylinder 14 supported on the X-axis slide 12 in a manner permitting its indexed rotation about a horizontal axis parallel to the Z axis. The tool support cylinder 14 is adapted to hold a plurality of tools 13 at indexed mounting positions around its peripheral surface. Accordingly, by rotating the tool support cylinder, a tool selected for a specific machining process can be brought into its operating position in the machining area.

The driving and controlling of the Z-axis slide 10 and the X-axis slide 12 in their respective feeding movements and the tool support cylinder 14 in its indexed rotation can be accomplished by any suitable known means. According to this invention, the two slides 10 and 12 are moved into specific positions by rotating feed screws 16a and 16b through servomechanisms 15a and 15b on the basis of numerical data of a numerical control system or the like.

A bar stock feeding mechanism 17 is disposed to the rear of and coaxially with the main spindle 4 and operates to grasp a bar stock W passed through the main spindle 4 and to feed the bar stock to the machining area. As shown in FIG. 1, the mechanism 17 has a feed carriage or head 18 slidably supported on a pair of spaced apart guide rods 20, which are supported parallelly to the main spindle 4 by support structures 19. The feed head 18, which can thus undergo sliding movement in forward and rearward directions parallel to the main spindle 4, has a longitudinal central bore of circular cross section coaxially aligned with the main spindle 4.

As illustrated in FIG. 4, the feed head 18 houses and supports within this bore a pair of bearings 22 which, in turn, rotatably support a support sleeve 21 in a manner preventing its sliding movement in the axial direction. An actuating tube 23 is fitted and supported in the support sleeve 21 in a manner permitting it to slide longitudinally relative to the support sleeve 21 but causing it to rotate unitarily therewith. Engagement collars 24 and 25 are secured to the outer surface of this actuating tube 23 respectively at the rear and front ends thereof. The support sleeve 21 has, at a part thereof between the feed head 18 and the engagement collar 24, a flange 21a, to the rear face of which a material feed chuck 26 is coaxially fixed by bolts 27 as illustrated in FIG. 6A.

This feed chuck 26 has a central bore and, at its rear side, a plurality of pairs of diametrically opposed grooves 28 extending radially. The feed chuck 26 further has, at parts thereof corresponding to the grooves 28, cavities in each of which a bell-crank lever 29 is pivotally supported. One end of each lever 29 is engaged with the above mentioned engagement collar 24, while the other end of the lever 29 is engaged with a recess 30a formed in one of a plurality of jaws 30 respectively fitted slidably in corresponding grooves 28. A gripping member 31 is fixed to the rear side of each jaw 30 by bolts 32 and nuts 33 disposed in a T-shaped groove provided in the jaw 30. Each gripping member 31 has a gripping part 31a adapted to grip a bar stock of a specific cross section such as a hexagon as shown in FIG. 6A or a square as shown in FIG. 6B. Thus, the gripping members 31 are made interchangeable to suit the bar stock W.

A lever 34 having upper and lower forked ends and pivotally supported by means of a pin 34a at an intermediate part thereof on the feed head 18 rotatably supports at its upper forked end a pair of rollers 35 engaged with the engagement collar 25 as shown in FIG. 5. The lower forked end of this lever 34 is pin-connected at 34b to the outer end of a piston rod 38 fixed to a piston 37a of another hydraulic cylinder 37, which is pin-connected at 37a to a bracket 36 secured to the feed head 18. A further hydraulic cylinder 39, which is secured integrally to the feed head 18, is provided therethrough with a piston rod 40, which is parallel to the main spindle 4 and is fixed to a piston 39a within the cylinder 39. The ends of the piston rod 40 extend beyond the ends of the cylinder and are fixed to the front and rear support structures 19 as shown in FIG. 3. Accordingly, by introducing fluid pressure into the hydraulic cylinder 39 on either of the two sides of the piston 39a of the piston rod 40, the feed head 18 is caused to undergo movement for feeding the bar stock.

A dog mounting plate 42 (FIG. 3) fixed to the bracket 36 supports dogs 41, and a limit switch LS-1 for operating cooperatively with the dogs 41 as described hereinafter is mounted on the rear support structure 19. A dog mounting plate 45 fixed to the above described lever 34 supports dogs 44, and a limit switch LS-2 for operating cooperatively with the dogs 44 as described hereinafter is mounted on the hydraulic cylinder 37.

The gripping action of the jaws 30 of the bar stock feeding mechanism 17 is produced through actuation by the hydraulic cylinder 37. The forward or rearward movement of the piston rod 38 pivotally rotates the lever 34, whereby the actuating tube 23 moves rearward or forward, thereby pivotally rotating the bellcrank levers 29, which thereby cause the gripped state of the bar stock to be loose or tight.

Referring to FIGS. 1 through 4, a bar end support 47 comprising a head 47b and a bar end support shaft 50 integral and coaxial with the head 47b is rotatably supported by bearings 48 on a support base structure 51, which, in turn, is supported on the cutting tool support cylinder 14. The function of this bar end support 47, which is thus supported coaxially with the axis of the main spindle 4, is to support, unrelatedly to the gripping action of the chuck spindle chuck 6, the forward end of the bar stock W positioned in the machining area at the time of feeding of the bar stock and to bring the bar stock W into the machining area through the feeding movement in the Z-axis direction of the tool head 5 corresponding to the feeding movement of the bar stock.

The head 47b of this bar end support 47 has, at its rear end, a conical surface 47a coaxially formed therewith for contacting and holding the forward end of the bar stock W in the machining area. This conical surface 47a is made concave for solid bar stock as shown in FIG. 2A and convex for tubular stock as shown in FIG. 2B. Furthermore, in view of the tendency of a delay to arise in the operation of a fluid-pressure or hydraulic control system with respect to commands of a numerical control system or the like relative to the feeding movement of the tool head 5, a compression coil spring 49 is disposed around the bar end support shaft 50 and interposed between the head 47b and the support base structure 51. At the time of docking of the head 47b with the forward tip of the bar stock, the head 47b is pressed against the bar stock W thereby to compress the spring 49. In this manner, the forward tip off the bar stock is prevented from separating from the conical surface 47a of the bar end support 47 at the time of feeding movement of the tool head 5.

To the rear of the bar stock feeding mechanism 17, there is provided a stock feed tube 52 disposed in the bar stock feed path and aligned coaxially with the main spindle 4. The function of this stock feed tube is to support the bar stock W and to absorb vibration of the rotating bar stock.

The bar stock W is further supported at the front end of the bar stock feeding mechanism 17 and the rear end of the first hydraulic cylinder 8 respectively by support members 53a and 53b, each having a hole of a shape bounded by a supporting surface matching the cross section of the bar stock, such as the surface 54 of the support member 53b as shown in FIG. 7 for a bar stock of hexagonal cross section. The geometrical figures of these supporting surfaces are angularly aligned in orientation, or phase, with those formed by the gripping parts 31a and 6b respectively of the feed chuck 26 and the main spindle chuck 6. These support members 53b and 53a, which are detachably secured respectively to the front end of the engagement collar 25 and the rear end of the first hydraulic cylinder 8, can thereby be readily exchanged to suit the cross section of the bar stock to be machined.

The bar stock feeding device of the above described construction according to this invention is prepared and operates in the following manner.

First, preparatory to the machining operation, the selected bar stock W is conveyed manually or automatically into the bar stock feed path, and the angular orientation, or phase, of its cross section figure is aligned with those formed by the gripping parts 31a and 6b of the feed chuck 26 and the main spindle chuck 6, respectively. This orientation, or phase, matching is facilitated by the above described support members 53a and 53b, which are selected and secured in place beforehand or at the time of emplacement of the bar stock in the device. The feed chuck 26 rotatably supported by the feed head 18 is thereby rotated unitarily with the main spindle 4 when the main spindle rotates. Thus, the main spindle 4 rotates continuously without stopping throughout the automatic bar stock feeding operation described hereinbelow. Moreover, the main spindle 4 and the feed chuck 26 rotate in unison throughout this operation.

When one cycle of the machining process of the machine tool in response to commands of a program of numerical control is completed, the following operation is carried out in compliance with commands of numerical control or the like. The Z-axis slide 10 and the X-axis slide 12 are driven in feeding movement, and the cutting tool support cylinder 14 is driven in its indexed rotation to bring the bar end support 47 into coaxial alignment with the axis of the main spindle 4 in the machining area where the previously cut off forward end of the bar stock W is positioned. The bar end support 47 is then pressed into coaxial contact with the forward end of the bar stock W.

Figure 9A:
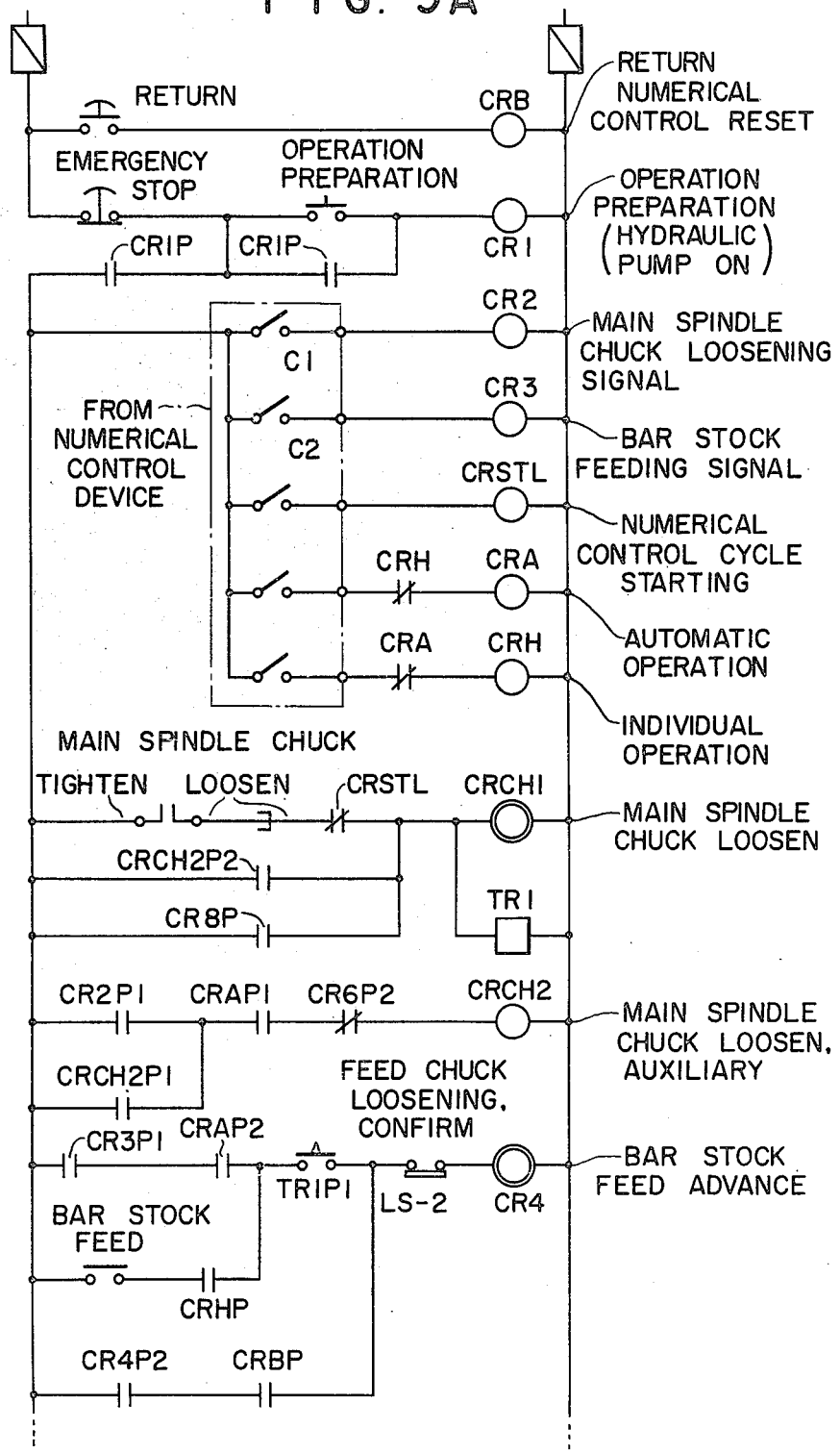
FIGS. 9A and 9B are partial electrical circuit diagrams of the bar stock feeding system according to the invention.
Figure 9B:
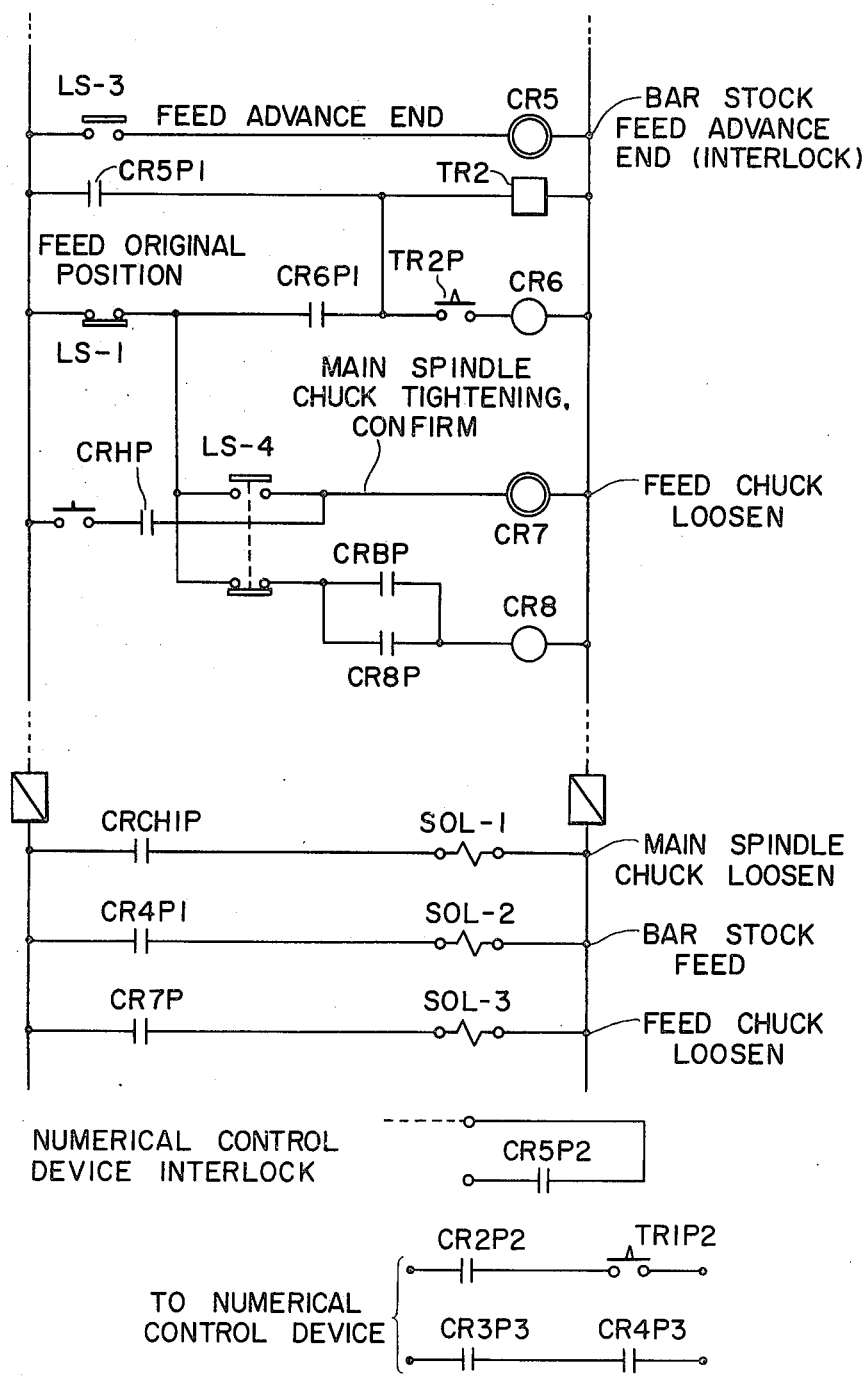

Then, in response to a numerical control command, a signal for loosening of the main spindle chuck 6 is generated to close a contact C1 shown in FIG. 9 and activates a relay CR2, whereupon a contact point CR2P1 of the relay CR2 is closed, and, through contact points CRAP1 and CR6P2, a relay CRCH2 operates, whereby, through a contact point CRCH2P2, a relay CRCH1 is activated. As a consequence of this activation of the relay CRCH1, its contact point CRCH1P is closed and a solenoid SOL-1 is energized through the contact point CRCH1P and operates a first changeover valve 55, shown in FIG. 3, to cause the piston 8a of the first hydraulic cylinder 8 to move rearward, whereby the main spindle chuck 6 becomes loose, and the bar stock W is released from its grip and assumes a state wherein its forward end is supported by the bar end support 47.

Simultaneously with the above mentioned activation of the relay CRCH1, a timer TR1 is operated, and its contact point TR1P1 is closed after lapse of the time set. Then, in response to a numerical control command, a contact C2 is closed to activate a relay CR3, whereupon its contact point CR3P1 is closed, so that a relay CR4 is activated through the contact point CR3P1 and a contact point CRAP2, which is closed because a relay CRA for automatic operation is activated. As a consequence, through a contact point CR4P1, a solenoid SOL-2 shown in FIG. 3 is energized to operate a second changeover valve 56, which causes the second hydraulic cylinder 39 to advance forward. Consequently, the feed head 18 and the feed chuck 26 mounted on the feed head 18 and in the state of gripping the bar stock W also advance forward. It will be understood that when a solenoid SOL-3 is not energized, the feed chuck 26 operates to grip the bar stock W. Simultaneously, in response to a numerical control command, the Z-axis slide 10 advances forward through the unit distance of feed of the bar stock W in correspondence with the feeding movement of the feed head 18.

When the feed head 18 contacts and is stopped by an adjustable stop 57 mounted on the front support structure 19 and determining the above mentioned unit distance of feed, or unit feed stroke, of the bar stock, and the dog 41 of the feed head 18 strikes against a limit switch LS-3 (FIG. 9) at the end of the forward feed stroke, a relay CR5 is operated, and, through its contact point CR5P1, a timer TR2 is operated. Another contact point CR5P2 is also closed. At the end of the timing period of the timer, a timer contact point TR2P is closed, whereby a relay CR6 is operated and is self held by means of a closed contact point CR6P1. When the feed head 18 reaches the forward end of its advance stroke, an interlocking signal is sent through the closed contact point CR5P2 to the numerical control, whereupon the Z-axis slide 10 temporarily stops.

As a consequence of the operation of the relay CR6, its normally closed contact point CR6P2 opens, and the relay CRCH2 is deenergized, whereupon its contact point CRCH2P2 opens and the relay CRCH1 is therefore deenergized. Consequently, the timer TR1 and the solenoid SOL-1 are deenergized, and the first changeover valve 55 is changed over to cause the piston 8a of the first hydraulic cylinder 8 to advance forward, whereby the main spindle chuck 6 again grips the bar stock W. This movement of the piston 8a of the first changeover cylinder 8 causes a dog 58 to press against a limit switch LS-4 (FIGS. 3 and 9) for confirming the tightening of the main spindle chuck 6. As a consequence, a relay CR7 operates, and, through its contact point CR7P, a solenoid SOL-3 is energized to actuate a third changeover valve 59, by the valving operation of which the piston 37a and piston rod 38 of the third hydraulic cylinder 37 advances forward, whereby the feed chuck 26 loosens its grip on the bar stock W, which is thereby released.

The above described operation of the third hydraulic cylinder 37 of the feed head 18 causes the dog 44 to open the limit switch LS-2 (FIGS. 3 and 9) for confirmation of loosening of the feed chuck 26, whereupon the relay CR4 is deenergized, whereby its contact point CR4P1 opens and the solenoid SOL-2 is deenergized. As a consequence, the second changeover valve 56 is changed over, and the second hydraulic cylinder 39 retracts rearward, whereby the feed head 18 retracts to its original position.

When the feed head 18 thus returns to its original bar feeding position, its dog 41 opens the limit switch LS-1 (FIGS. 3 and 9), whereupon the relay CR6 is deenergized and the self-held state of the timer TR2 by the point CR6P1 is terminated. On the other hand, the relays CR5 and CR7 are also deenergized, whereupon the solenoid SOL-3 is deenergized, and the third changeover valve 59 becomes inoperative. Consequently, the piston rod 38 of the third hydraulic cylinder 37 retracts rearward to cause the feed chuck 26 to tighten and grip the bar stock W.

At this time, as a result of being released from the interlocking signal of the numerical control, the Z-axis slide 10 again operates in accordance with a program command of the numerical control to withdraw from the forward tip of the bar stock W, whereby the bar end support 47 is released from its function of supporting the end of the bar stock. Then, as a result of the feeding movements of the Z-axis slide 10 and the X-axis slide 12 and the indexed rotation of the cutting tool support cylinder 14, a tool 13 corresponding to the specific machining process is selected and advances into the machining zone, and one series or cycle of machining steps is carried out.

Figure 8:
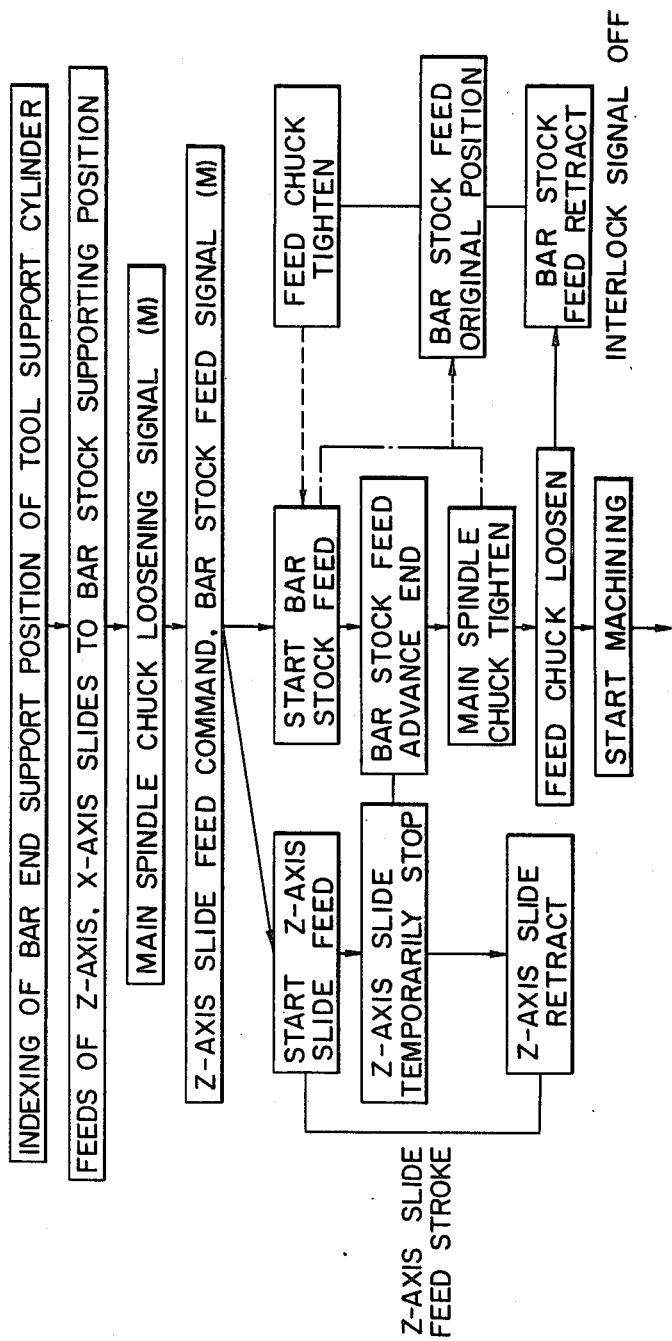
FIG. 8 is an operational flow chart indicating the relationships between various actions in the bar stock feeding system according to the invention.

By repeating the above described cycle of bar stock feeding operation, which is illustrated in FIG. 8, machining is carried out until the bar stock W is consumed. Furthermore, considering the possibility of an accident or some unforeseen trouble occurring during the feeding of the bar stock, a safety circuit is included in the device and is activated by the pushing of a button to cause the bar stock, in its gripped state, to return to its original position.

The above described operation of the bar stock feeding device according to this invention in conjunction with the machine tool is indicated pictorially in the work flow chart shown in FIG. 8.

As described above, in the operation of feeding the bar stock in the system of this invention, the main spindle 4 does not stop rotating, and the bar stock W gripped by the feed chuck 26 of the feed head 18 is caused to rotate unitarily with the main spindle 4. At the same time, the forward end of the bar stock W is supported by way of a bar end support 47, and the bar stock is brought into the machining zone by the feeding movements of the slides 10 and 12 corresponding to the feeding movement of the bar stock. For this reason, the problems of heat generated by the stopping of the main spindle 4 and of the head-shaking oscillation of the stock are overcome, and the idle time is eliminated.

Other embodiments of this invention will now be described in conjunction with FIGS. 10 and 11, in which those parts which are the same as or equivalent to corresponding parts in FIGS. 1 through 6B are designated by the same reference numerals. Detailed description of such parts will not be repeated. The points on which these examples of the bar stock feeding device differ from that of the preceding embodiment of the invention are as follows. Whereas the cutting tool support cylinder 14 of the first embodiment is disposed on the forward side (right side as viewed in FIGS. 1 and 2) of the tool head 5, that in the device illustrated in FIGS. 10 and 11 is disposed on the rear side. Another difference is that the wedge action of the main spindle chuck 6 in these latter two embodiments is opposite in direction to that of the first embodiment.

In the embodiment shown in FIG. 10, the bar stock feeding mechanism 17A supports the rear end of the bar stock W of a circular cross section and pushes the bar stock forward. This mechanism 17A comprises, essentially, a pushing bar 64 for engagement with the rear end of the bar stock W, a cable 62 secured at one end to the pushing bar 64, a weight 63 to which the other end of the cable 62 is secured, and pulleys 61 for suitably guiding the cable 62 and inverting its direction. The specific length of the bar stock W thus fed at every machining cycle is determined by a bar stop (not shown) provided in the machining zone.

In the embodiment shown in FIG. 11, a feed head or bar feed gripping means 18 (rotating feed rollers or pawls), etc., installed in the bar stock feed path is actuated by a mechanical or fluid-pressure device to grip and feed the bar stock W.

Returning to the embodiment illustrated in FIG. 10, the forward end of the bar stock W positioned in the machining zone is engaged and supported by a bar end support 47A unrelatedly to the gripping action of the chuck 6 of the main spindle 4b Then, as a result of the feeding movement in the Z-axis direction of the slide 10 corresponding to the feeding movement of the bar stock W, this bar end support 47A brings the bar stock in a steady state precisely to a position in the machining zone for machining. As shown in FIG. 12, this bar end support 47A is rotatably supported by way of bearings 48 to a support base structure 51, which is in turn supported by the cutting tool support cylinder 14 similarly as in the preceding embodiment of the invention. The bar end support 47A has conical surface 47a of suitable skirt diameter, which engages the forward tip of the bar stock W. This conical surface 47a is made concave for engaging a solid round bar stock but may be made convex for engaging a tubular bar stock.

Next, the operation of feeding the bar stock W in the case where this bar end support 47A is used in conjunction with the feed mechanism illustrated in FIG. 10 will be described. Upon completion of one cycle of machining process of the machine tool 1, the Z-axis slide 10 and the X-axis slide 12 are respectively moved in feeding movements, while the cutting tool support cylinder 14 is rotated in indexed rotation in response to a program command of a numerical control system or the like thereby to bring the bar end support 47A to a position to contact the forward tip of the bar stock W, which is aligned coaxially with the main spindle centerline in the machining area in the vicinity of the chuck 8 of the main spindle 4. The chuck 6 thereupon opens, and the bar stock W is released from the grip of the chuck and the rotation of the main spindle, but immediately the cable 62 is pulled by the weight of the weight 63, and the pushing bar 64 pushes against the rear end of the bar stock and advances forward.

During this operation, the main spindle 4 is rotating unrelatedly to the operation of feeding the bar stock. As a result of the pushing action of the pushing bar 64, the forward tip of the bar stock is pressed against the concave conical surface 47a of the bar end support 47A, whereupon the Z-axis slide 10 starts to move in the Z-axis feed dijection tajough a specific bar stock feed distance. As a consequence of this starting of the feeding motion, the bar stock W is advanced into the machining zone by a specific distance in correspondence to the pushing movement of the pushing bar 64 and the feeding movement of the Z-axis slide 10 as it is supported in coaxially alignment with the main spindle centerline. The above described operation is successively repeated for every machining cycle until the bar stock is completely consumed.

The bar end support 47 described hereinbefore with reference to FIG. 2 is suitable for use in conjunction with the feeding mechanism of the aforedescribed first embodiment of the invention and with the feeding mechanism shown in FIG. 11. The bar stock feeding mechanism shown in FIG. 11 has a feed chuck 26 which is similar in principle and action to the main spindle chuck 6 and is different from that in the feed mechanism of the first embodiment of the invention. As a resultant effect, however, the operations of the two feed mechanisms are similar. The feed mechanism shown in FIG. 11 is also operated by a fluid-pressure system controlled in conjunction with the Z-axis and X-axis slides 10 and 12 and the cutting tool support cylinder 14 by a numerical control system including an electrical circuit as described hereinbefore with reference to FIG. 9.

What I claim is:

1. In a machine tool of the type comprising a hollow main spindle having therein a main chuck for gripping a bar stock and confronting at a front end thereof a machining zone, a bar stock feeding mechanism having a rotatable feed chuck for gripping the bar stock and being disposed to the rear of the main spindle to feed intermittently the forward leading end of the bar stock through the main spindle and the main chuck, which is in a loosened state, from the rear thereof for every cycle of machining, and a tool support structure supported on feed slides and having tools mounted thereon for machining the bar stock, said tool support structure being so disposed that a selected tool mounted thereon can be brought into said machining zone to carry out the machining; the improvement which comprises a bar end support mounted on the tool support structure in a manner permitting the bar end support to rotate freely about the centerline axis of the main spindle, first means for moving said feed slides and the tool support structure, at the start of each intermittent feeding movement of the bar stock feeding mechanism so as to cause said bar end support to abuttingly engage and support the forward leading end of the bar stock in a manner to hold the bar stock coaxially with the main spindle between said rotatable feed chuck of the bar stock feeding mechanism and the rotatable bar end support, and second means for moving said feed slides along the centerline axis of the main spindle through a distance corresponding to a unit distance of feed of the bar stock by said bar stock feeding mechanism as the mechanism is operated for feeding, thereby to cause the bar end support to continue to support rotatingly the end of the bar stock and bring the stock fully into position for machining in the machining zone, irrespective of the rotation of the main spindle, whereby the cyclic bar feeding and machining operation can be continuously carried out without stopping the main spindle.

2. A machine tool according to claim 1, further including resilient means urging the bar end support against the leading end of the bar stock.

3. A machine tool according to claim 1 in which the surface of the bar end support contacting the end of the bar stock is a concave conical surface of dimensions suiting the dimensions of the bar stock end for effective supporting thereof.

4. A machine tool according to claim 1 in which the surface of the bar end support contacting the end of the bar stock, in the case where the bar stock is a hollow structure, is a convex conical surface of dimensions suiting the dimensions of the bar stock end for effective supporting thereof.

5. A machine tool according to claim 1 in which, in the case where the bar stock is of a cross-sectional figure other than a circle, the gripping parts of the feed chuck and of the main chuck are of shapes suitable for said cross-sectional figure and are mutually matched in angular alignment, or phase, prior to operation, and the bar stock is rotated unitarily with the main spindle during operation.

6. A machine tool according to claim 5 in which support members having central apertures of a shape matching the cross sectional figure of the bar stock for contacting the outer surface of the bar stock are detachably secured respectively to a part of or integrally connected to the main spindle and to a part of or integrally connected to a rotating member of the bar stock feeding mechanism thereby to support the bar stock passed therethrough.

* * * * *